United States Patent [19]

Schneider

[11] 3,760,932

[45] Sept. 25, 1973

[54] SECTIONAL CONVEYOR APPARATUS
[75] Inventor: Walter M. Schneider, Chicago, Ill.
[73] Assignee: Conveyor Systems, Inc., Morton Grove, Ill.
[22] Filed: Jan. 21, 1972
[21] Appl. No.: 219,766

[52] U.S. Cl............................................. 198/127 R
[51] Int. Cl............................................. B65g 13/02
[58] Field of Search.................. 198/127 R, 160, 221

[56] References Cited
UNITED STATES PATENTS
3,420,355   1/1969   DeGood et al.................. 198/127 R
3,667,589   6/1972   Constable....................... 198/127 R
3,420,356   1/1969   DeGood........................... 198/127 R Primary Examiner—Evon C. Blunk
Assistant Examiner—H. S. Lane
Attorney—Wallenstein et al.

[57] ABSTRACT

A sectionalized conveyor system comprising contiguous conveyor sections each having spring urged article position sensing means urged into the path of articles moving thereon to detect the passage of an article thereover. Engagement of an article position sensing means by an article on a conveyor section effects the movement of a reciprocated pawl means associated with the conveyor section immediately behind the same into moving engagement with an associated actuating means thereby moved into a position where it is latched by an associated latch means. The movement and latching of the actuating means into such position terminates operation of the latter conveyor section as long as the article position sensing means is engaged by the article. Each cycle, the continuously reciprocated pawl means momentarily releases the actuating means from the associated latch means so the actuating means can return readily to its initial position when the associated article position sensing means returns to its original position as the article involved leaves contact therewith.

11 Claims, 9 Drawing Figures

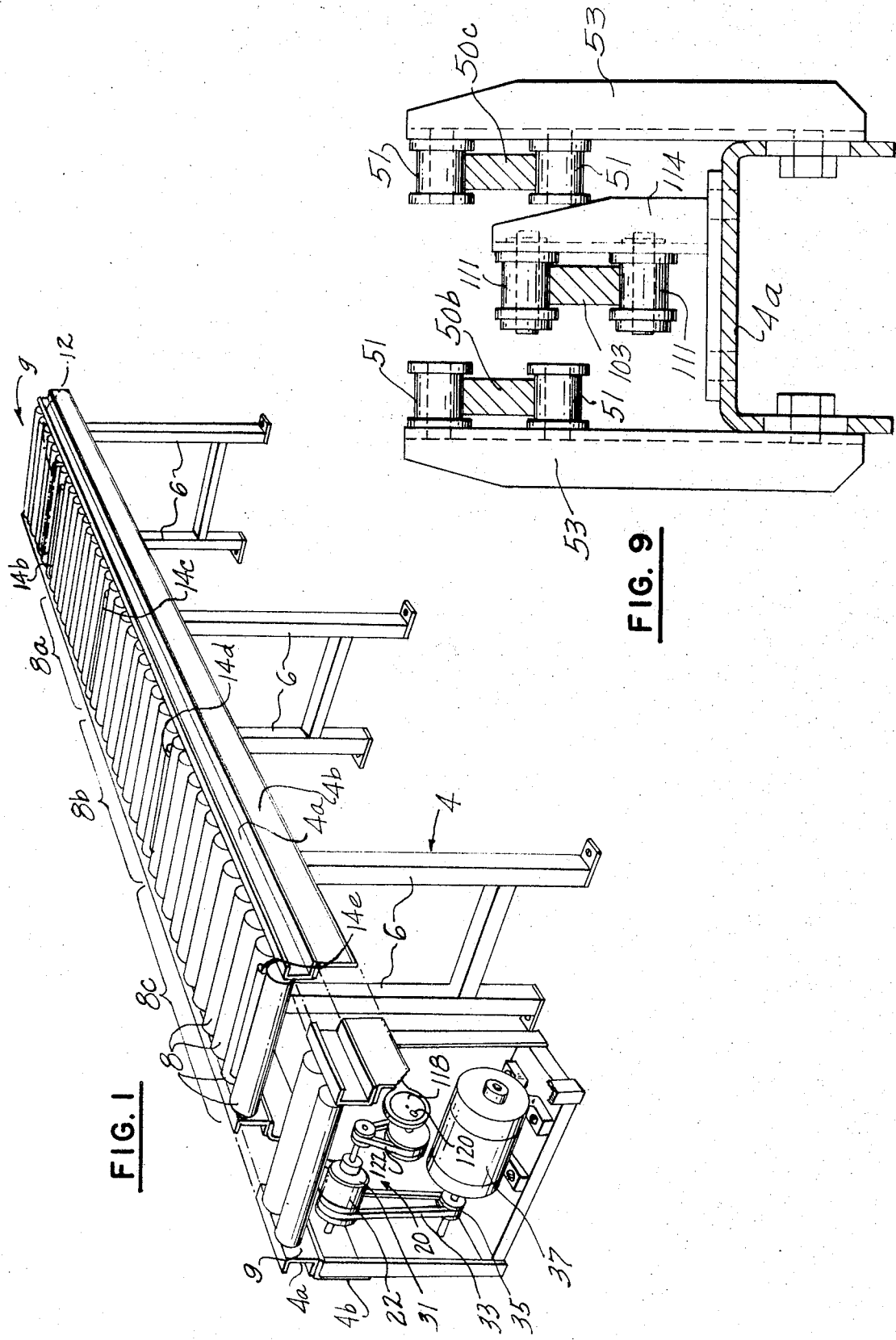

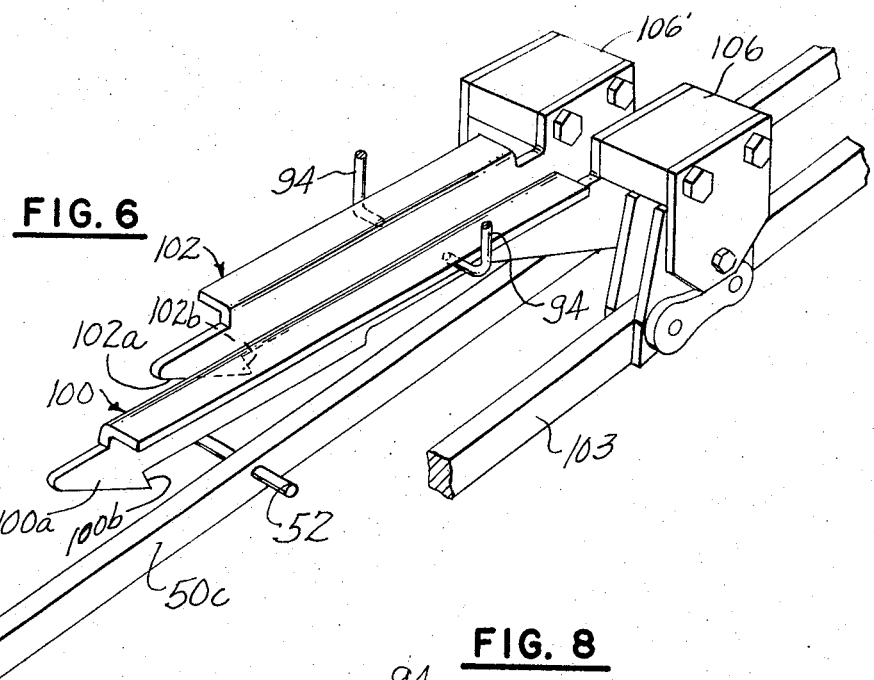
FIG. 6
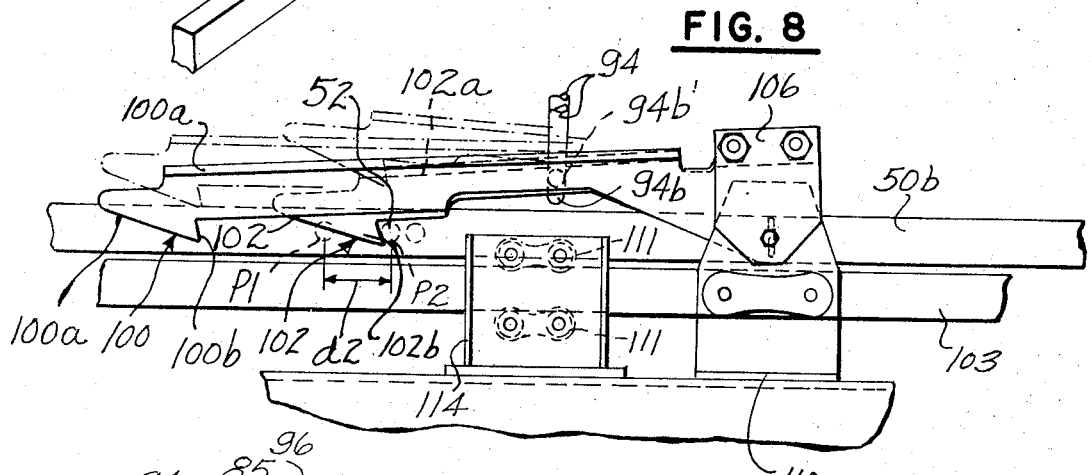
FIG. 8
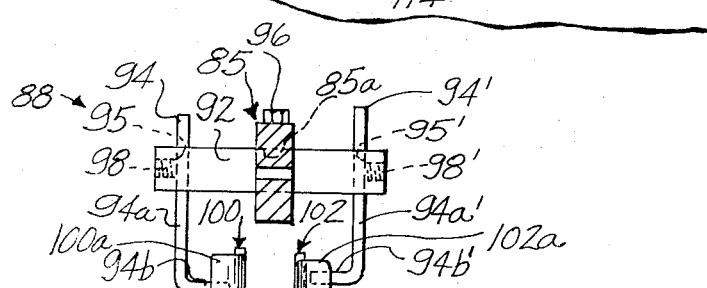
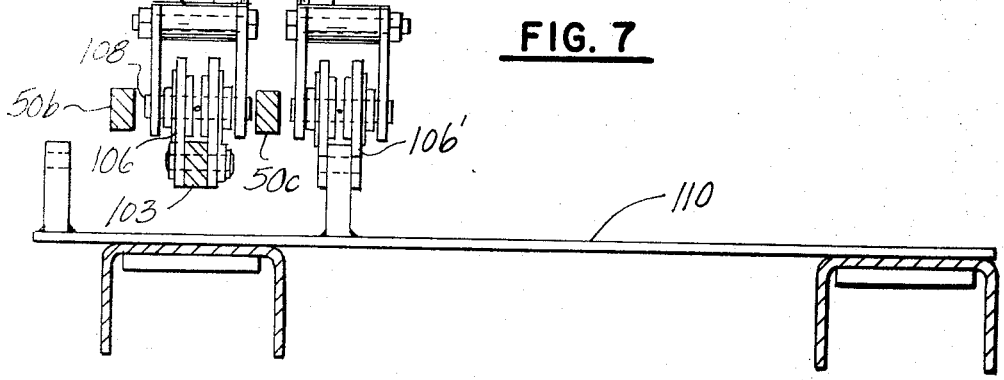
FIG. 7

SECTIONAL CONVEYOR APPARATUS

This invention relates to article conveyors, and most particularly to article conveyors of a type having a number of longitudinally spaced conveyor sections which are separately driven by mechanisms operated by the articles traveling on the conveyor in a manner which prevents the build up of large back pressures when the lead article is accidentally or intentionally prevented from leaving a conveyor section.

In a sectionalized conveyor of the type referred to above, a series of article position sensing elements are positioned along the conveyor at the front end portions of the various sections thereof. The article sensing elements are usually spring urged or counterweighted elements which respond to the pressure of an article passing thereover. Each of the article position sensing elements are designed to control drive uncoupling means on the conveyor section behind the one adjacent to which the sensing element is positioned. In most conveyors of this type heretofore utilized, the article position sensing element directly operates mechanical linkages where depression of the sensing elements must overcome the opposition forces of a roller carrying belt pressing frame or the like, to relieve the drive force. In some conveyors, the article position sensing element operates a pneumatic or hydraulic drive control means which furnishes the main force to operate the drive uncoupling means. In the former case, the article weight manifestly becomes a factor in the proper operation of the article drive uncoupling means since a very light-in-weight article may not overcome the back pressure on the article position sensing element. The use of hydraulic or pneumatic drive control means increases the cost and complexity of the conveyor. When the first or lead article passes over and properly operates an article position sensing element, the driving force on the conveyor section controlled thereby is immediately terminated until the article leaves the article position sensing element. This prevents an article held in position over one of the sensing elements from being crushed by a driving force applied to the articles behind it. When the article approaching the sectionalized conveyor with a desired spacing and no article stoppage is to occur this desired spacing of the article will be often undesirably altered by the conveyor described especially when light articles are involved since a conveyor section will always be stopped during the time an article passes over a sensing element and the article involved will slow down appreciably where inertial effects are minimal. Also, there will be needless wear of parts which are repeatedly operated each time an article passes over a sensing element in the absence of a desired article stoppage operation.

In a sectionalized conveyor of the present invention, when an article position sensing element senses the presence of an article on a conveyor section, the drive means for the immediately succeeding conveyor section is not, but for occassional circumstances, immediately affected for the short period necessary for the article to pass by the article position sensing element involved, so that the spacing of the articles is affected only to a modest degree, if at all, as they move by the various sections of the conveyor. However, if an article is stopped on a conveyor section, the article position sensing element for the conveyor section will indicate the continued presence of the article, and a time responsive coupling means associated with the immediately succeeding conveyor section becomes effective to move the conveyor section drive means involved to a position where power is uncoupled from the latter conveyor section. The present invention achieves these results in a very simple and reliable manner.

In accordance with the most advantageous form of the invention, the aforesaid time delay action of the coupling means is accomplished by the use of pawl means and spring urged latch means associated with each conveyor section other than the first, and associated continuously operating power means which continuously reciprocates or otherwise moves each pawl means, when the controlling article position sensing element does not sense the presence of an article, over a first given path where the pawl means is inoperative and, when the controlling article position sensing element senses the presence of an article, over a second path where the pawl means is operative to engage a projecting portion of an associated spring urged actuating means (sometimes referred to as an actuator bar) after the pawl means has been moved a given distance. After engagement of the actuating means by the pawl means, the pawl means moves a given distance to bring the actuating means involved into a second position where it effects movement of the associated conveyor section drive means into a position where power is decoupled from the associated conveyor section. Also, when an article position sensing element senses the presence of an article on a conveyor section, the associated latch means is moved into a position to latch the actuating means in said second position, so that the continued or reverse movement of the pawl means will not result in the return of the actuating means to its initial position as long as the latch means continues to latch the actuating means in place.

If the pawl means is caused to move in the aforesaid second path at any instant, other than the rare instance where the pawl means happens to be in or near that one operating position along its path of movement where it can engage with the projecting portion of the associated actuating means, the actuating means is uneffected until the pawl means is subsequently moved into this operating position along its path of travel, which usually takes a period of time greater than that necessary for an article to pass by an article position sensing element. Thus, the normal mode operation of the conveyor system is one wherein continuously moving articles passing along the various conveyor sections will have only a minimal effect on the spacing between the articles even when they are light-in-weight. If the sectionalized conveyor happens to be on a small upward incline when the loss of drive power on a conveyor section would cancel or substantially reduce any desired inertial affects of a heavy article, the conveyor of the invention will ensure a substantially continuous drive on the conveyor sections unless article stoppage is desired. The wear on those parts which engage or slide over other parts during a drive termination operation are also reduced by the present invention. Furthermore, since the power needed to operate the actuating means does not come from the force of an article against an article position sensing element, the article position sensing element can be operated by light-in-weight articles which merely needs to overcome the force of springs holding the article position sensing element in the path of the article to permit the pawl and latch means to drop into their operative positions.

The above and other objects, features and advantages of the invention will become apparent upon making reference to the specification to follow, the claims and the drawings wherein:

FIG. 1 is a perspective view of a portion of a sectionalized conveyor system to which the various features of the present invention are applied;

FIG. 6 is a perspective view of the pawl, latch and actuator bar mechanism used in the conveyor system of FIGS. 1-5;

FIG. 7 is a transverse vertical sectional view of the conveyor system shown in FIG. 2, taken along section lines 7—7 thereof;

Figure 3:
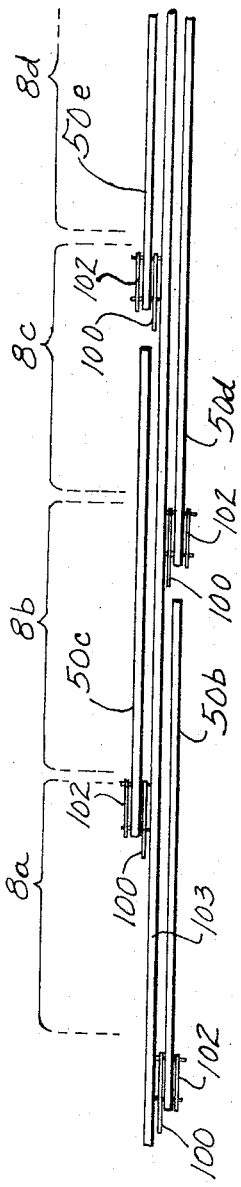
FIG. 3 is a diagrammatical view of the various sections of the conveyor and related power and actuator bar apparatus associated therewith for the conveyor system shown in FIGS. 1 and 2 and showing the relative locations thereof.

FIG. 8 is an enlarged side elevational view showing in solid lines the lowered position of the pawl and latch apparatus shown in FIG. 6, and in dashed lines the raised position thereof; and FIG. 9 is an enlarged transverse vertical sectional view through a portion of the conveyor system illustrating the manner in which the transfer and actuator bars forming part of the conveyor system are movably supported.

Referring now more particularly to FIG. 1, the conveyor thereshown and generally indicated by reference numeral 2 includes a frame structure 4 supported on legs 6. The frame structure 4 comprises horizontally disposed and laterally spaced side frame sections each comprising a pair of superimposed channel members 4a and 4b oriented with their flanges facing outwardly, the lower flange of each upper channel member 4a welded or otherwise secured to the upper flange of the adjacent lower channel member 4b. (Obviously, the side frame sections can have other configurations and constructions without deviating from the spirit of the invention.)

Projecting slightly above the elevation of the upper flanges of the upper channel members 4a and 4b are longitudinally spaced article carrying rollers 8. For reasons to be explained, these rollers are arranged in groups respectively identified as 8a, 8b, 8c, etc. proceeding from the discharge end 9 of the conveyor. These groups of rollers form individually controlled conveyor sections. Each of these groups of rollers preferably extends a distance which is slightly larger than the length of the largest article to be carried on the conveyor. (The individual rollers in a given group will be sometimes identified by their group identifying characters 8a, 8b, 8c. etc.)

Each of the rollers 8 is freely rotatably supported in any suitable way between the upper channel members 4a—4a. Article position sensing rollers 14b, 14c, 14d, etc. are provided which are respectively positioned at the forward end of the groups of rollers 8a, 8b, 8c, etc. The article position sensing roller 14b at the front end of the first group of rollers 8a controls the coupling and uncoupling of drive power to the second group of rollers 8b, the sensing roller 14c at the front of the second group of rollers 8b controls the coupling and uncoupling of drive power to the third group of rollers 8c and so on. The article position sensing rollers are normally urged into a position elevated slightly above the tops of the rollers 8 so that they are in the path of movement of and are depressed by the articles moving on the conveyor. When an article position sensing roller is in an elevated position, the article carrying rollers 8 of the group of rollers controlled thereby are coupled to a source of drive power. When an article comes to rest on an article position sensing roller to depress the same, the source of drive power is decoupled from the article carrying rollers of the immediately preceeding group of rollers.

Figure 2:
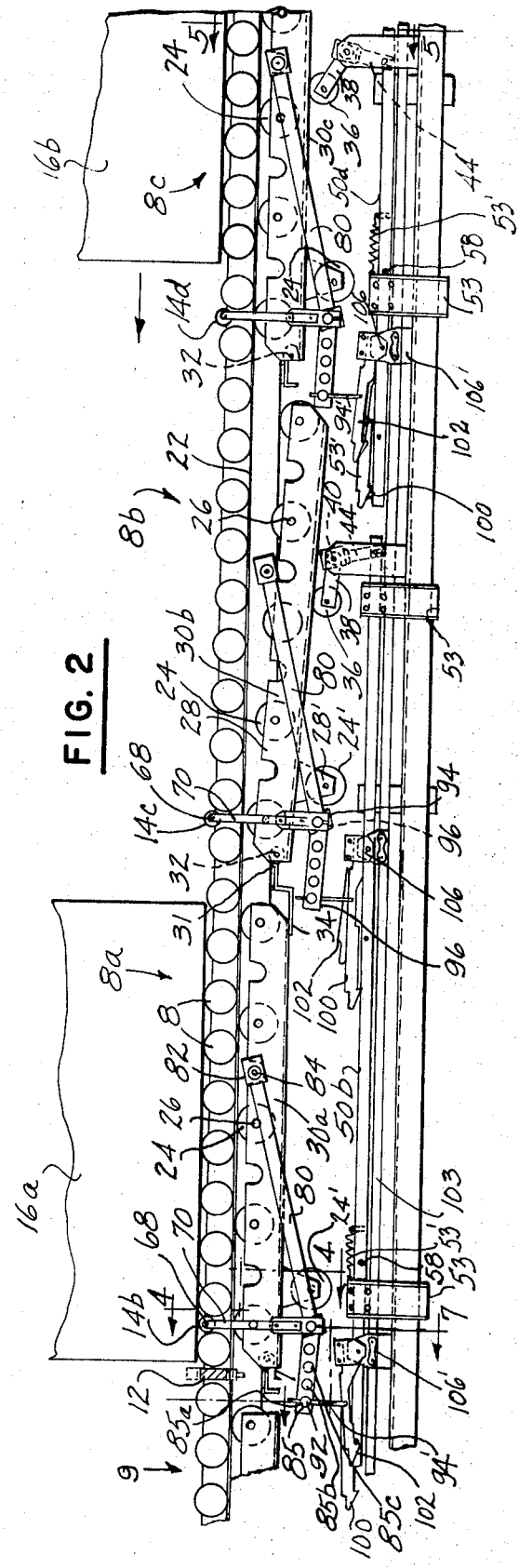
FIG. 2 is a fragmentary longitudinal sectional view through the conveyor system shown in FIG. 1.

The first group of rollers 8a are continuously driven, and a vertically movable article stop member 12 or the like (FIG. 2) is supported in any suitable way at the discharge end 9 of the conveyor. When the article stop member 12 is raised above the elevation of the rollers 8, the forwardmost article (box 16a in FIG. 2) thereon will come to rest against the stop plate where it depresses the article position sensing roller 14b to stop the driving of the second group of rollers 8b. This condition is illustrated in FIG. 2. A box 16b immediately behind the first box 16a and then on the third group of rollers 8c will move under the driving force of these rollers until it leaves rollers. The second box 16b will reach the second article position sensing roller 14c at the front end of the second group of rollers 8b due to its inertia or by being gently pushed to it by the driven boxes behind it. Eventually, all of the article position sensing rollers will be under the boxes so that the driving force will be removed from all of the article carrying rollers except the first group of rollers 8a. It is apparent that the first box 16a will not have any pressure applied to it by the boxes stacked up behind it which, in the absence of the sectionalized control feature just described, might crush the first box 16a if the rollers supporting them were driven. When the article stop plate 12 is lowered, the boxes will proceed to move in sequence so that a large space is left between all the boxes.

As previously explained, sectionalized conveyors operating in the manner just described are old in the art. The present invention relates to a unique means which couples and uncouples power from the article carrying rollers 8b, 8c, 8d, etc. in rsponse to the movement of the article position sensing rollers.

Figure 4:
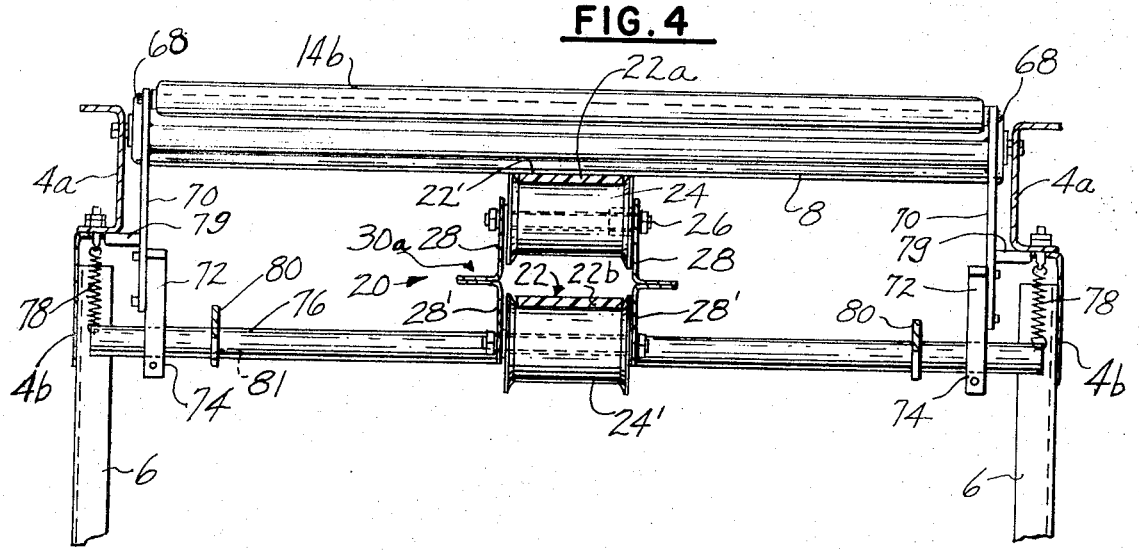
FIG. 4 is a transverse vertical sectional view through the conveyor system shown in FIG. 2, taken along section lines 4—4 thereof.

The main source of drive power for driving the rollers 8 is a continuously moving belt drive system generally indicated by reference numeral 20 (FIG. 4). As illustrated, this belt drive system comprises a flat or V-belt 22 having a flat outer surface 22' and extending into a series of grooved or flanged pulley wheels rotatably mounted upon stub shafts 26. The pulley wheels are arranged in groups immediately below each group of rollers 8a, 8b, 8c, etc. Each such group of pulley wheels comprises an upper series of pulley wheels 24 rotatably mounted between spaced vertical walls 28—28 of a frame unit 30a, 30b, or 30c etc. The upper section 22a of the belt 22 passes between the flange of the upper series of pulley wheels 24 of the various frame units, and the bottom section 22b of the belt 22 passes between the flanges of pulley wheels 24', one such pulley wheel being rotatably supported between spaced arms 28'—28' depending from each frame unit. Near one end of the coneyor, the belt 22 passes over a pulley wheel 31 driven by a belt 33 extending to a drive pulley wheel 35 on the shaft of a motor 37 (FIG. 1). As viewed in FIG. 2, the upper section 22a of the belt 22 moves to the right to rotate the rollers 8 in a counterclockwise direction so the boxes or other articles involved are moved to the left. (In FIG. 1, the conveyor is illustrated so the boxes would be moved to the right.)

Figure 5:
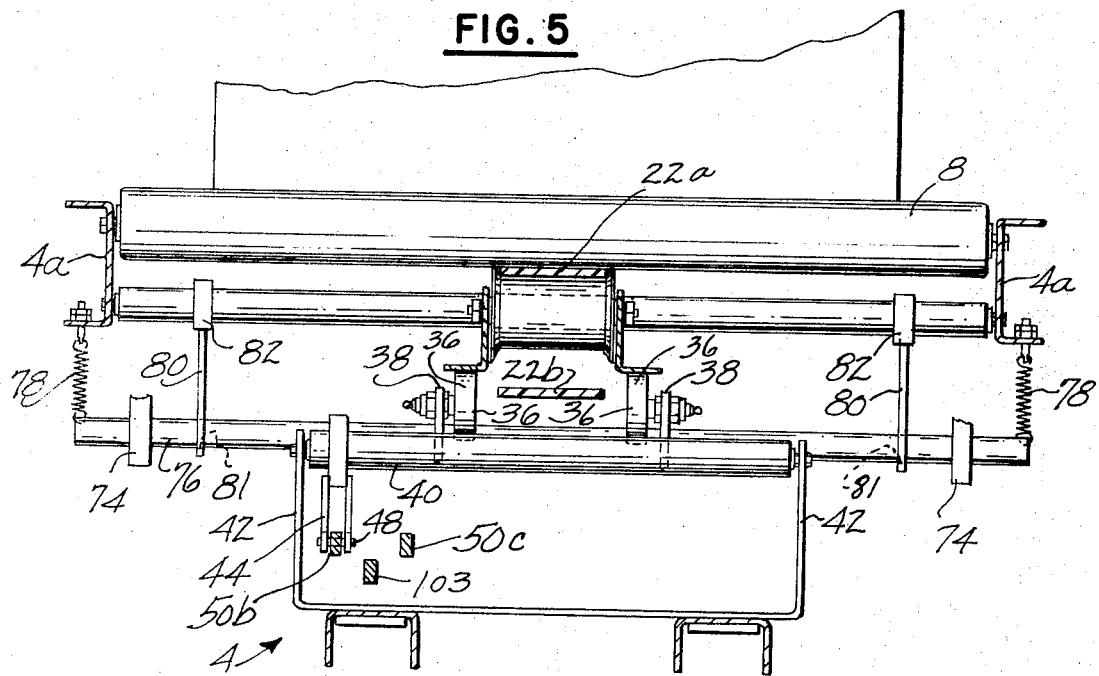
FIG. 5 is a transverse vertical sectional view through the conveyor system shown in FIG. 2, taken along section lines 5—5 thereof.

Each pulley wheel 24 of each group of pulley wheels 30a, 30b, 30c etc. is positioned below and between a different contiguous pair of rollers 8—8 of the group of rollers involved. Each frame unit 30b, 30c etc. except the first frame unit 30a, is mounted for individual vertical pivotal movement between a normal raised position where the upper section 22a of the belt 22 is tightly pushed against the bottom surfaces of the various pairs of rollers 8—8 referred to, so that the movement imparted to the belt 22 will be transferred to the rollers 8—8, and a lowered position where the upper section 22a of the belt 22 is in effect decoupled from the rollers 8—8. Each of the frame units including the first frame unit 30a as shown has a pivot-forming sleeve 31 at its front end mounted around a pivot-forming shaft 32. However, the rear end of the frame unit 30a is permanently anchored in a raised position, where the portion of the belt 22 above the same is in driving relation to the first group of rollers 8a, by a cross frame member 34. Each of the other frame units 30b or 30c etc. below the other groups of rollers 8b, 8c, etc. is adjustably mounted about its associated pivot axis 32 by suitable movable lift means which in FIGS. 2 and 5 are shown to comprise a pair of lift rollers 36—36 carried on the ends of respective arms 38—38 anchored to a cylindrical shaft 40 rotatably mounted between a pair of support arms 42—42 anchored to the frame structure 4. The shaft 40 of the lift means associated with each frame unit 30b, 30c, etc. as illustrated, carries at one end a bifrurated arm 44 which engages with a pin 48 or other suitable projecting portion of an actuating means illustrated as a horizontally extending bar 50b or 50c, etc. to be referred to as an actuator bar.

Each actuator bar 50b, 50c, etc. is guided for horizontal movement between horizontally spaced rollers 51—51 supported from brackets 53 anchored to a vertically adjustable portion 4a of the frame structure 4 of the conveyor, as best shown in FIGS. 2 and 9. The actuator bars 50b, 50c, etc. associated with adjacent groups of rollers 8b, 8c, etc. are mounted in horizontally spaced relation (i.e. alternate in position on one side or the other of a longitudinal line) to avoid interference between adjacent actuator bars as best shown in FIG. 3.

In FIG. 2, the lift rollers 36—36 associated with the frame unit 30b below the second group of rollers 8b is shown pivoted counterclockwise from its normal uppermost position by the movement of the associated actuator bar 50b to the right from its normal left hand position so as to drop the associated frame unit 30b to a position which decouples the belt 22 from the group of rollers 8b. In a manner to be explained, this movement of the actuator bar 50b is occasioned by the depression of the article position sensing element 14b projecting upwardly between the first pair of rollers 8—8 of the first group of rollers 8a. The actuator bar 50b (as best shown in FIGS. 2 and 3) extends from a point below and in front of the front end of the group of rollers 8a to a point just rearwardly of the operating arm 44 associated with the lift rollers 36—36 near the middle portion of the frame unit 30b below the second group of rollers 8b. Similarly, the actuator bar 50c extends from a point substantially in front and below the second group of rollers 8b to a point below the middle portion of the third frame unit 30c. In a manner to be described, depression of the article position sensing roller 14c located between the first pair of rollers 8—8 of the second group of rollers 8b controls the position of the actuator bar 50c, in turn controlling the coupling of drive power to the third group of rollers 8c in the same manner as the bar 50b controls the coupling of drive power to the second group of rollers 8b, as will be described.

The present invention deals with the manner in which a depression of the various article position sensing rollers 14b, 14c, 14d, etc. controls the movement of the various associated transfer bars 50b, 50c, etc.

Each of the actuator bars 50b, 50c, etc. (as best shown in FIG. 6) carries adjacent the front end thereof a laterally extending pin 52 which projects beyond both side faces of the actuator bar involved. Spring means 53' (see FIG. 2) anchored between a stationary bracket 53 and a portion of the actuator bar urges the bar to the left as viewed in FIG. 2, where a stop pin 58 or the like engages the bracket 53 or other stationary portions of the frame structure 4. In this position of the actuator bar involved, the associated lift rollers 36—36 are in their raised position which urges the portion of the belt 22 passing between the group of pulley wheels involved into driving position with the associated group of rollers 8.

As perhaps best shown in FIGS. 2 and 4, each article position sensing element 14b, 14c, etc. is shown as a roller rotatably mounted upon a rod 68 secured between a pair of vertical arms 70 vertically adjustably anchored to a pair of wings 72—72 of a pair of collars 74—74 affixedly anchored to a horizontally extending cylindrical member 76. The cylindrical member 76 is supported by a pair of springs 78—78 extending between the ends of the cylindrical member 76 and the aforementioned upper channel members 4a—4a. The springs 78—78 urge the entire assembly of the cylindrical member 76, the arms 70—70, rod 68 and the article position sensing roller into an upper position. Stop pins 79—79 projecting from the arms 70—70 engage the upper channel members 4a—4a to limit the upward movement of this assembly.

Pawl and latch control means to be described associated with each group of rollers 8b, 8c, etc. are operated by the depression of an article position sensing roller 14b or 14c, etc. Each of these control means includes an elongated control arm 80 secured by a collar 82 to a horizontally extending cylindrical member 84 pivotally mounted between the upper channel members 4a—4a (see FIG. 5). The control arm 80 has a circular opening 81 which receives the aforementioned cylindrical member 76 which is moved downwardly against the restoring force of the srpings 78—78 when an article passes over the article position sensing roller involved. The control arm 80 has a horizontally extending split end portion 85 at the bottom thereof which has horizontally spaced openings 85a, 85b, 85c, etc. for providing a selection for the placement of an adjustable lift rod assembly generally indicated by reference numeral 88. The lift rod assembly 88 (FIG. 7) includes a cylindrical member 92 adapted to be clamped into place within a selected opening 85a, 85b, 85c, etc. by the tightening of a clamp screw 96 at the end of the split end portion 85. The cylindrical member 92 carries lift rods 94—94' at the opposite ends thereof. By loosening a clamp screw 96 (FIG. 2), the cylindrical member 92 can be rotatably adjusted within any of the openings 85a, 85b, 85c, etc. to vary the horizontal position of the bottom ends of the lift rods 94—94'.

The lift rods have vertically extending shank portions 94a–94a' passing through diametrically extending openings 95–95' in the cylindrical member 92 whose position within these openings is fixed by anchoring screws 98–98' extending axially through the ends of the cylindrical member 92 and intersecting the aforementioned diametrically extending openings 95–95'. The bottom ends of the shank portions 94a–94a' of the lift rods terminate in inwardly extending end portions 94b–94b' engaging the bottom surfaces of flanges 100a – 102a respectively in the intermediate portions of a pawl member 100, having its rear end pivotally supported on a continuously reciprocating power bar 103 by a pivot-forming bracket 106 and a latch member 102 having its rear end pivotally supported on a stationary support 110 (FIG. 7) through a pivot forming bracket 106'.

The power bar 103 which extends the full length of the conveyor beneath the various groups of rollers 8a, 8b, 8c, etc. is mounted for horizontal reciprocating movement between various horizontally spaced pairs of rollers 111—111 (FIG. 9) mounted on brackets 114 supported on the vertically adjustable portion 4a of the conveyor frame structure. The power bar 103 is mounted below and between the various actuator bars 50a, 50b, etc. which are positioned alternately on opposite sides of the power bar. The power bar 103 is reciprocated in any suitable way such as by the connection of one end thereof to an adjustable crank means 118 (FIG. 1) secured to a continuously rotating shaft 120 driven by a belt 122 driven through a coupling means from the aforementioned motor 37.

As the power bar 103 is reciprocated, the various pawl members 100 spaced longitudinally therealong opposite the various control arms 80 associated with the various article position sensing rollers 14b, 14c, etc. are similarly reciprocated. (For example, the power bar may be reciprocated back and forth over the path of 2 ⅞ inches at a rate of 40 reciprocations per minute for an article speed of 78 feet per minute and an article length of 18 inches. The free end of each pawl member 100 has a downwardly and rearwardly extending surface 100a which terminates at its bottom end in a rearwardly facing vertical shoulder 100b. The rearwardly facing shoulder 100b of each pawl member is movable in two distinct paths as the power bar is reciprocated, depending upon the elevation of the associated article position sensing roller 14b or 14c, etc. When an article position sensing roller and the associated control arm 80 are in their upper positions, the rearwardly facing shoulder 100b of the associated pawl member 100 moves in a generally horizontal upper path which does not intercept the associated aforementioned pin 52 extending from the associated transfer bar. When the associated article position sensing roller 14b or 14c, etc. and the associated control arm 80 are in their lowered positions, the rearwardly facing shoulder 100 b of the associated pawl member 100 moves back and forth in a lowered horizontal path. After moving rearwardly the distance d1 from its extreme left hand position (FIG. 8), the rearwardly facing shoulder 100b thereof will engage an end of the pin 52 to move the transfer bar involved to the right and slightly beyond a position identified as position P2 in FIG. 8. In position P2, the latch member 102 can latch around the pin 52 to hold the actuating member in this position. To permit for an easy unlatching action, the pawl member moves the pin 52 somewhat beyond the position P2, so the pin 52 is pulled out of engagement with the latch member, where an upper force on the latch member can raise the latch member out of the way of the pin 52 when the article which initially depressed the associated article position sensing roller moves away therefrom.

The rear end of the latch member 102 pivotally mounted to bracket 106' secured to the support 110 has a front end thereof with a downwardly and rearwardly extending surface 102a terminating in a rearwardly facing latching shoulder 102b. As above indicated, the latch member 102 is raised above the associated actuator bar pin 52 by the associated lift pin 94 when the associated article position sensing roller 14b or 14c, etc. is in its upper position. When, however, the article position sensing roller is depressed by an article, the downward movement of the control arm 80 will lower the lift pin 94 to drop the latch member 102 so that the rearwardly facing latching shoulder 102b is in a position to engage the actuator bar pin 52 when the associated pawl member 100 has moved the same into the position P2 shown in FIG. 8.

It should now be apparent that when an article rides over a given article position sensing roller 14b or 14c, etc. the resultant lowering of the associated control arm 80 and the pawl and latch members 100 and 102 will not automatically result in the movement of the associated actuator bar to the position P2 since this will not occur until such time as the rearwardly facing shoulder 100b of the pawl member involved engages the associated actuator bar pin 52 at a time when the pawl member is moving to the right, as viewed in the drawings. This will not generally occur until after a given time delay period has gone by sufficient to enable an article to pass over the article position sensing roller involved. Moreover, it is apparent that the main power for moving the pulley wheel carrying frame units 30b, 30c, etc. comes from the power bar 103 and the force required to depress an article position sensing roller and lowering the latch and pawl members 100 and 102 need only be a force to overcome the force of the springs, and so even a relatively light-in-weight article can initiate an actuator bar moving operation.

It should be understood that numerous modifications may be made to the preferred form of the invention described above without deviating from the broader aspects of the same.

I claim:

1. In a sectionalized conveyor system comprising contiguous conveyor sections forming different parts of a conveyor system for moving articles along a given path encompassed by said conveyor sections; respsective article position sensing means associated with said respective conveyor sections for sensing the presence and absence of articles thereon; first conveyor section drive means for continuously driving the first of said conveyor sections; respective conveyor section drive means for the other conveyor sections each having a first normal drive condition for driving the associated conveyor section and a second condition where drive power is disconnected from the associated conveyor section; and article position responsive means associated with each of said conveyor sections and responsive normally after a given delay period to the sensing by the article position sensing means of the conveyor section ahead of the conveyor section involved of the presence of an article on the former conveyor section by operating the conveyor section drive means of the latter conveyor section in said second condition, said delay period indicating the stoppage of such article on the former conveyor section, the improvement wherein the article position responsive means associated with each conveyor section includes: latch means having a normal inoperative position when the associated article position sensing means of the conveyor section ahead of the conveyor section involved indicates the absence or momentary presence of an article on the former conveyor section and has an operating position when the last mentioned article position sensing means indicates the stoppage of an article on the conveyor section ahead of the conveyor section involved, actuating means for normally operating the associated conveyor section drive means in said first normal drive condition and movable into a second position to operate the associated conveyor section drive means in said second position, and operating means repeatedly moved in a first path relative to the associated actuating means where it does not engage the associated actuating means when the article position sensing means of the conveyor section ahead of the conveyor section involved indicates the absence of an article on the former conveyor section and repeatedly moved along a different path relative to said actuating means where at a given point in its relative path of travel it engages said actuating means and moves the same into a position to be engaged by the associated latch means in said operating position, where the actuating means involved is maintained in said second position when the article position sensing means of the conveyor section ahead of the conveyor section involved indicates the stoppage of an article thereon.

2. In a sectionalized conveyor system having contiguous conveyor sections forming different parts of a conveyor system for moving articles along a given path encompassed by said conveyor sections, a different article position sensing means associated with each conveyor section for sensing the presence or absence of an article thereon, first conveyor section drive means for continuously driving the first of said conveyor sections, other respective conveyor section drive means for the other conveyor sections and each having a first normal drive condition for driving the associated conveyor section and a second condition where drive power is disconnected from the associated conveyor section, and actuating means for each of said other conveyor section driving means for normally operating the associated conveyor section drive means in said first normal drive condition and movable from a first to a second position to operate the associated conveyor section drive means in said second condition, the improvement comprising operating means and latch means associated with each of said actuating means, means responsive to an article position sensing means of a given conveyor section indicating the presence of an article thereon for causing the operating means associated with the conveyor section immediately behind the latter conveyor section to engage the associated actuating means and move the same into said second position and to effect the latching of said actuating means into said second position by said associated latching means, each of the latching means becoming disengaged from the associated actuating means when the article position sensing means associated therewith indicates that the article sensed by the article position sensing means involved is moving from the conveyor section involved.

3. The sectionalized conveyor of claim 2 wherein there is provided spring means normally urging each of the actuating means into said first position thereof and spring means urging each of said article position sensing means into the path of movement of an article on the associated conveyor section, each said responsive means including means for moving said operating means respectively to actuating means engaging and actuating means disengaging positions and for moving each of said latch means between actuating means latching and actuating means unlatching positions as said associated article position sensing means is respectively engaged by the movment of an article thereagainst and released by the movement of the article away from the same.

4. In a sectionalized conveyor system having contiguous conveyor sections forming different parts of a conveyor system for moving articles along a given path encompassed by said conveyor sections, respective article for sensing the presence or absence of an article thereon, position sensing means associated with said conveyor sections means movable in front of said first conveyor section to stop the movement of articles therefrom, first conveyor section drive means for continuously driving the first of said conveyor sections, other respective conveyor section drive means for the other conveyor sections and each having a first normal drive position for driving the associated conveyor section and a second position where drive power is disconnected from the associated conveyor section, and actuating means for each of said other conveyor section driving means which actuator means is spring urged into a first position for normally operating the associated conveyor section drive means in said first normal drive position and movable against a spring forced from a first to a second position to operate the associated conveyor section drive means to said second position, the improvement comprising: operating means associated with each of said other conveyor sections, continuously driven power means for continuously moving said operating means, said operating means being movagle relative to said power means from a normal first position into which it is spring urged, where said power means repeatedly moves the same over a first given path, to a second position where said power means repeatedly moves the same over a second path, each of said actuating means having a projecting portion adapted to be operatively engaged by the operating means of the associated conveyor section only at one point in said second path of travel thereof as the operating means moves in a given direction thereagainst and moved to advance the actuating means to said second position, means associated with each conveyor section and responsive to the sensing of the presence of an article by the article position sensing means of the conveyor section immediately ahead of the conveyor section involved for moving the associated operating means into said second position where the power means moves the same in said second path of travel and responsive to the sensing by the latter article position sensing means of the absence of an article for enabling the associated operating means to return to said first position where said power means moves the same in said first given path, and latch means associated with each of said operating means for latching the actuating means into said second position when moved to said position by said operating means and for releasing said actuating means from said second position when the article position sensing means involved senses the absence of an article on the conveyor section ahead of the conveyor section involved.

5. The sectionalized conveyor system of claim 4 wherein said power means reciprocates each of said operating means over said first and second paths, said operating means being a pawl means which engages the projecting portion of the associated actuating means when moved only in one direction thereagainst and passes over the same when moved in the opposite direction thereover.

6. In a sectionalized conveyor system having contiguous conveyor sections forming different parts of a conveyor system for moving articles along a given path encompassed by said conveyor sections, a different article position sensing means associated with each conveyor section for sensing the presence or absence of an article thereon, first conveyor section drive means for continuously driving the first of said conveyor sections, other respective conveyor section drive means for the other conveyor sections and each having a first normal drive condition for driving the associated conveyor section and a second condition where drive power is disconnected from the associated conveyor section, and actuating means for each of said other conveyor section driving means for normally operating the associated conveyor section drive means in said first normal drive condition and movable from a first to a second position to operate the associated conveyor section drive means in said second condition the improvement comprising pawl means associated with each of said activating means, pawl engageable means on each of said actuating means to be engaged by the associated pawl means moving in a given operating direction to move the associated actuating means to said second position, continuously driven power means for the various actuating means which power means repeatedly normally moves each pawl means in a position spaced from the pawl engageable means of the associated actuating means, and coupling means responsive to the article position sensing means of the conveyor section immediately ahead of the conveyor section involved and indicating the presence of an article on the former conveyor section by causing the pawl means of the succeeding conveyor section to be moved by said power means in said given operative direction against the pawl-engageable means of the actuating means associated with the latter conveyor section and move the actuating means to said second position, and latch means for each of the actuating means and responsive to the article position sensing means of the conveyor section immediately ahead of the conveyor section involved indicating the presence of an article thereon by latching onto a portion of the latter actuating means when in said second position for holding the actuating means in said second position, thereby to terminate the movement of the conveyor involved, and responsive to the last mentioned article position sensing means indicating the absence of an article on said former conveyor section by disengaging from the latter actuating means to effect the return of said actuating means to said first position.

7. The sectionalized conveyor system of claim 6 wherein there is provided means raisable in front of said first conveyor section to stop the movement of articles therefrom.

8. The sectionalized conveyor system of claim 6 wherein said power means is a reciprocating means carrying said pawl means longitudinally spaced thereon and respectively positioned adjacent said pawl engageable means of the actuating means associated with said various other conveyor sections, each of said pawl means being adapted to engage with the associated pawl engageable means when the article position sensing means of the conveyor section ahead of the conveyor section involved indicates the continued presence of an article on said former conveyor section and adapted to pass over the associated pawl engageable means of the associated actuating means when the article position sensing means of the conveyor section ahead of the conveyor section involved indicates the absence of an article on said former conveyor section.

9. The sectionalized conveyor system of claim 6 whereon each of said actuating means is spring urged into said first position which normally operates the associated conveyor section drive means in said first normal drive positions and movable against a spring force to said second position to operate the associated conveyor section drive means to said second position of the succeeding conveyor section to be moved by said power means in said given operative direction against the pawl-engageable means of the actuating means associated with the latter conveyor section and move the actuating means to said second position.

10. The sectionalized conveyor system of claim 9 wherein said power means is a reciprocating means carrying said pawl means longitudinally spaced thereon thereon positioned adjacent said pawl engageable means of the associated actuating means, each of said pawl means being adapted to pass over the pawl engageable means of the associated actuating means when the pawl means is moved in a reverse direction from said given direction.

11. The sectionalized conveyor system of claim 10 wherein said pawl means always moves said actuating means a distance somewhat beyond said second position to permit the easy disengagement of the latch means from the actuating means when the article position sensing means indicates the absence of an article on said former conveyor section.

* * * * *